(12) United States Patent  
Hilbourne

(10) Patent No.: US 8,961,220 B2
(45) Date of Patent: Feb. 24, 2015

(54) MULTIPURPOSE ULTRA-PORTABLE ELECTRONICS CABLE

(71) Applicant: Jason Arthur Hilbourne, Portland, OR (US)

(72) Inventor: Jason Arthur Hilbourne, Portland, OR (US)

(73) Assignee: Jason Arthur Hilbourne, Portland, OR (US)

( * ) Notice: Subject to any disclaimer, the term of this patent is extended or adjusted under 35 U.S.C. 154(b) by 95 days.

(21) Appl. No.: 13/894,229

(22) Filed: May 14, 2013

(65) Prior Publication Data

US 2013/0309901 A1 Nov. 21, 2013

Related U.S. Application Data

(60) Provisional application No. 61/647,358, filed on May 15, 2012.

(51) Int. Cl.
*H01R 13/62* (2006.01)
*H01R 13/516* (2006.01)
*G06F 1/16* (2006.01)
*H01R 31/06* (2006.01)

(52) U.S. Cl.
CPC ............ *H01R 13/516* (2013.01); *G06F 1/1632* (2013.01); *H01R 31/065* (2013.01); *H01R 2201/16* (2013.01)
USPC ........................................................ 439/502

(58) Field of Classification Search
USPC .............. 439/502, 371, 373, 219, 67, 74, 119
See application file for complete search history.

(56) References Cited

U.S. PATENT DOCUMENTS

| 6,017,222 | A  | * | 1/2000  | Kao ................................. 439/67 |
| 6,340,306 | B1 | * | 1/2002  | Daoud ............................ 439/219 |
| 6,595,786 | B2 | * | 7/2003  | Horiuchi et al. ................. 439/74 |
| 6,939,161 | B1 | * | 9/2005  | Yi et al. ......................... 439/373 |
| 7,500,867 | B1 | * | 3/2009  | Doglio et al. .................. 439/371 |
| 8,003,887 | B1 | * | 8/2011  | Hsieh et al. ..................... 174/69 |
| 8,215,967 | B2 | * | 7/2012  | Hsieh et al. ..................... 439/67 |
| 8,512,053 | B2 | * | 8/2013  | Worth et al. ................... 439/119 |
| 2002/0167806 | A1 | * | 11/2002 | Thaxton ........................ 362/191 |
| 2013/0309901 | A1 | * | 11/2013 | Hilbourne ..................... 439/502 |

* cited by examiner

*Primary Examiner* — Alexander Gilman
(74) *Attorney, Agent, or Firm* — Marger Johnson & McCollom PC

(57) ABSTRACT

A configurable cable for supporting an/or coupling a portable media device includes a main body with a first electrical connector on a terminal end thereof, a trunk extending from an opposing terminal end of the main body, and a second electrical connector formed on a terminal end of the trunk, wherein the second electrical connector is electrically coupled to the first electrical connector via wires running through a core of the trunk. Left and right legs extend from the opposing terminal end of the main body and on either side and substantially parallel to the trunk such that the body, trunk, and legs are disposed substantially in a plane in a first position of the configurable cable. The trunk and left and right legs are bendable from the first position into at least one of a plurality retained positions out of the plane.

11 Claims, 10 Drawing Sheets

MULTIPURPOSE ULTRA-PORTABLE ELECTRONICS CABLE

CROSS-REFERENCES TO RELATED APPLICATIONS

This application claims the benefit from U.S. Provisional Patent Application No. 61/647,358 filed May 15, 2012 whose contents are incorporated herein in their entirety for all purposes.

BACKGROUND OF THE INVENTION

1. Field of the Invention

This invention relates generally to flexible electrical cables and more particularly to such cables that can be configured into a plurality of retained shapes.

2. Description of the Prior Art

Smart phones and portable media devices such as the iPod® distributed by Apple, Inc. are typically used to wirelessly make telephone calls, send and receive text messages, or download/upload content through the Internet. These devices, however, must be periodically physically connected to computers or to power outlets via cables so that their data may be synchronized with that of another computer and/or their battery recharged. The cables used to connect these devices typically include a flexible cable or wire having a first type of connector (e.g. USB) fixed to one end and a second type of connector (e.g. 30-pin iPhone® connector) fixed to an opposite end of the cable. During charging or synching, the media device is connected to one end of the cable and the other end plugged into a computer or charging device.

While certainly adequate for their intended purpose, such traditional cables have several disadvantages. First, such long flexible cables require that the media device or smart phone be laid on the floor when charging and thus serve as a tripping hazard. Second, such flexible cables are unable to support the media device or smart phone for displaying of content.

Accordingly, the need remains for a compact, multipurpose electronics cable that serves as both an electrical connector of the device as well as a mount or tripod for display of content from a connected device.

SUMMARY OF THE INVENTION

The invention works as a charging and syncing cable for an iPhone or other portable media device. In general, the invention comprises a "skeleton" of bendable wires encapsulated in a flexible molded material so that the resulting electronics cable is bendable and configurable for different use modes. In a preferable embodiment, the invention has three "legs" or other appendages (herein referred to as two legs and a trunk) that contain bendable wire cores. The middle leg (e.g., the "trunk") also contains the USB or other wiring to support the cable's charging and synching function. The legs and most of the invention are over-molded in a thermo-plastic elastomer to encapsulate the bendable wire cores and the USB wiring. In addition to charging and synching, the invention can also be bent and used as a small tripod to support the iPhone. The invention can also be bent to allow the user to lean the iPhone against the wall during charging.

In general, the invention comprises a configurable cable having a main body with a first electrical connector on a terminal end thereof, a trunk extending from an opposing terminal end of the main body, and a second electrical connector formed on a terminal end of the trunk, wherein the second electrical connector is electrically coupled to the first electrical connector via wires running through a core of the trunk. Left and right legs extend from the opposing terminal end of the main body and on either side and substantially parallel to the trunk such that the body, trunk, and legs are disposed substantially in a plane in a first position of the configurable cable. The trunk and left and right legs are bendable from the first position into at least one of a plurality retained positions out of the plane.

BRIEF DESCRIPTION OF THE DRAWINGS

The foregoing and other objects, features and advantages of the invention will become more readily apparent from the following detailed description of a preferred embodiment of the invention that proceeds with reference to the accompanying drawings, in which.

DETAILED DESCRIPTION

Figure 1:
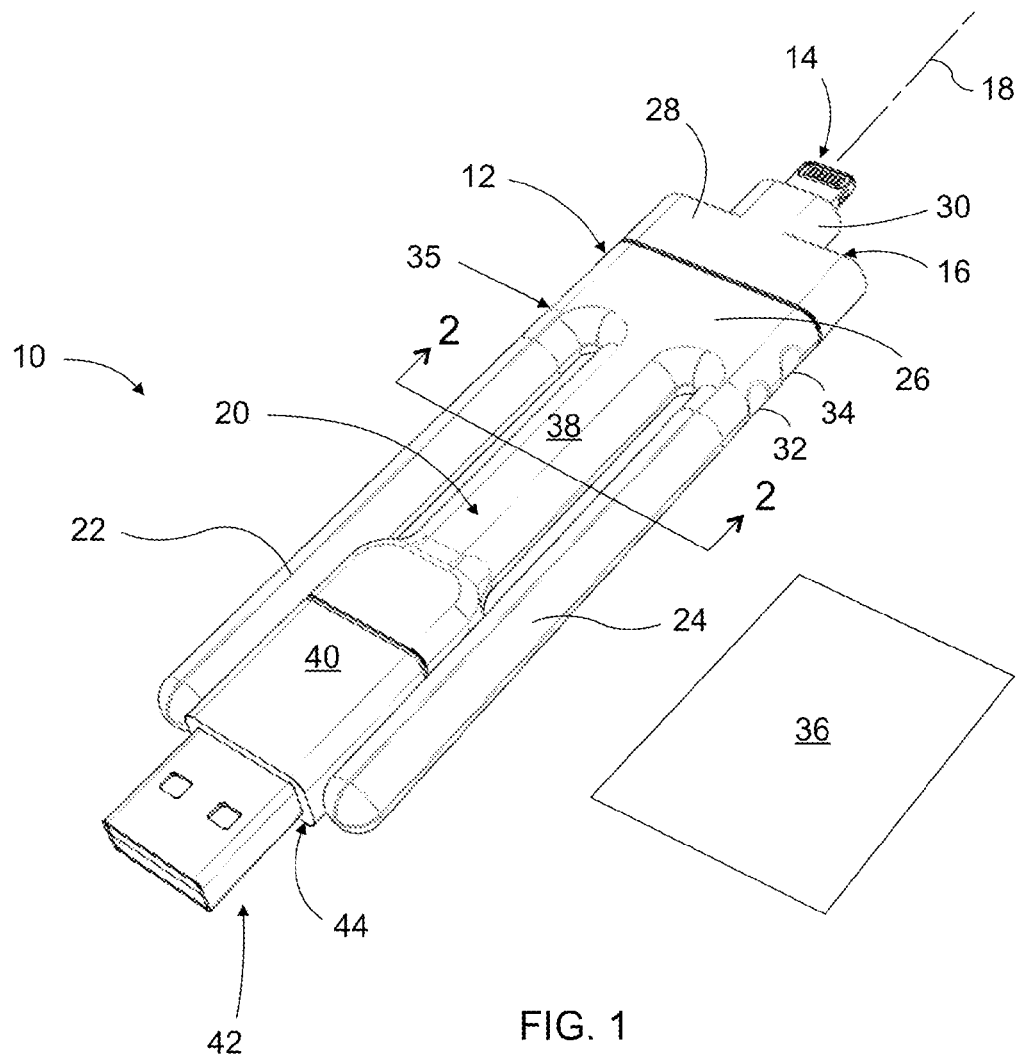
FIG. 1 is a perspective view of the electronics cable constructed according to a preferred embodiment of the invention.

FIG. 1 shows a configurable cable 10 constructed according to one embodiment of the invention. Cable 10 includes a main body 12 having a first electrical connector 14 on a terminal end 16 thereof and extending along a long axis 18 of cable 10. As will be appreciated from a discussion further below, electrical connector 14 may be any one of a plurality of different connectors adapted to be inserted into a portable media device such as a smart phone, portable game player or MP3 player (not shown). Although the electrical connector 18 shown in the figures is a Lightning connector, other such connectors are possible such as a Micro USB connector, Thunderbolt™ or Mini DisplayPort (MDP), Firewire connector, dock connector (such as the 30-pin connector originally used for Apple, Inc's iPhone and iPod products), 3.5 mm phone connector, or other pin-bus connector without departing from the spirit of the invention.

Main body 12 is configured to encapsulate any necessary electronics to drive the electrical connector 18 and to serve as an integrated mounting platform for the trunk 20 and legs 22, 24 described further below. In one embodiment, the main body 12 is manufactured with a main portion 26 and a cap 28 forming the terminal end 16. Cap 28 can include a connector projection 30 whose dimensions and design are typically dictated by the type of electrical connector 14 used. One or more depressions, e.g. depressions 32, 34, can be formed along one or both outside edges of the main portion 26 to provide a visual cue of where a user of the configurable cable 10 should grasp the cable for use. The cable 10 may be reinforced in this area, as by providing additional structural support or material thickness, so that the cable is less prone to break when used.

Figure 4:
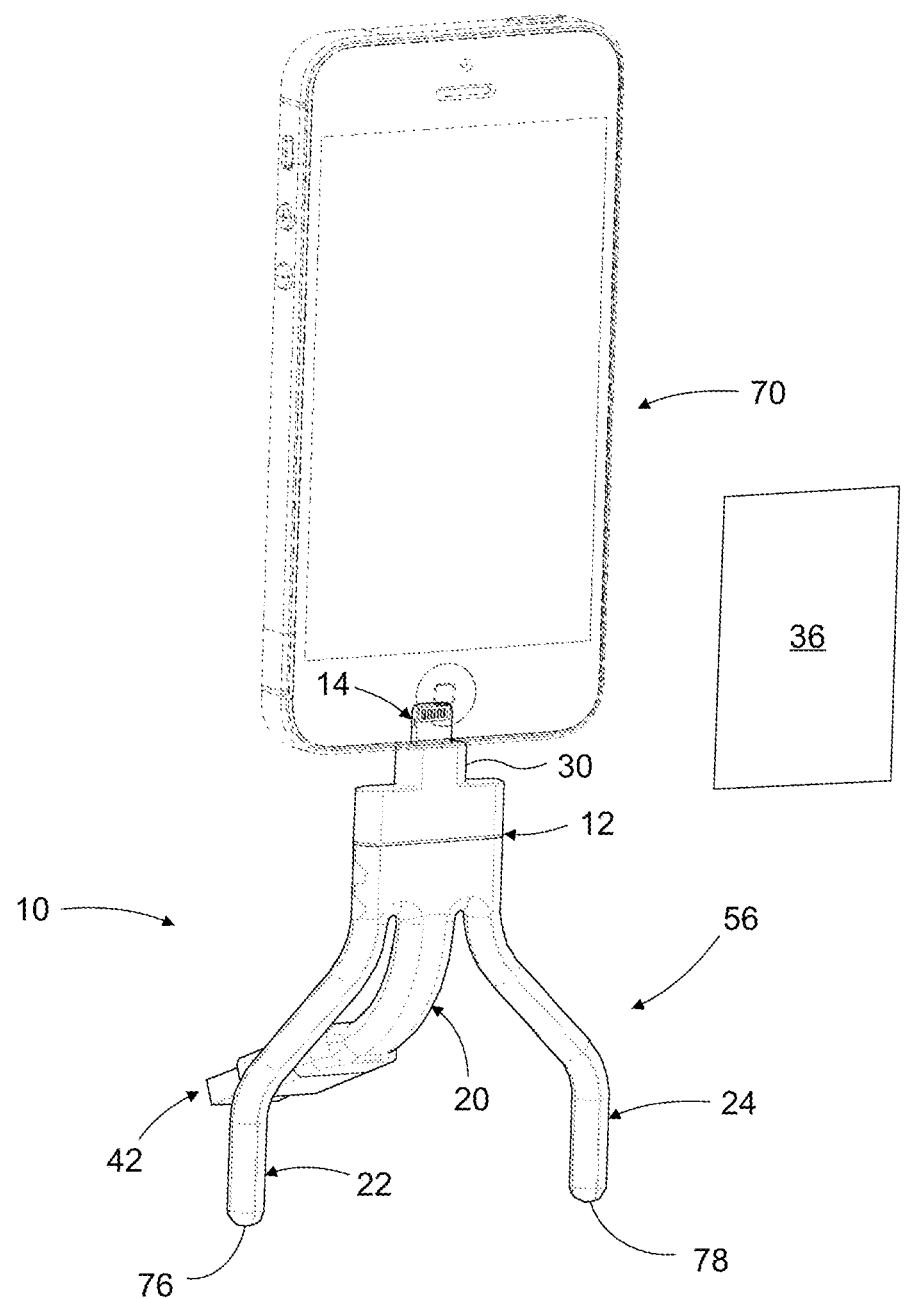
FIG. 4 is a perspective view of the electronics cable of FIG. 1 bent into a second/display position according to teachings of the invention.
Figure 5:
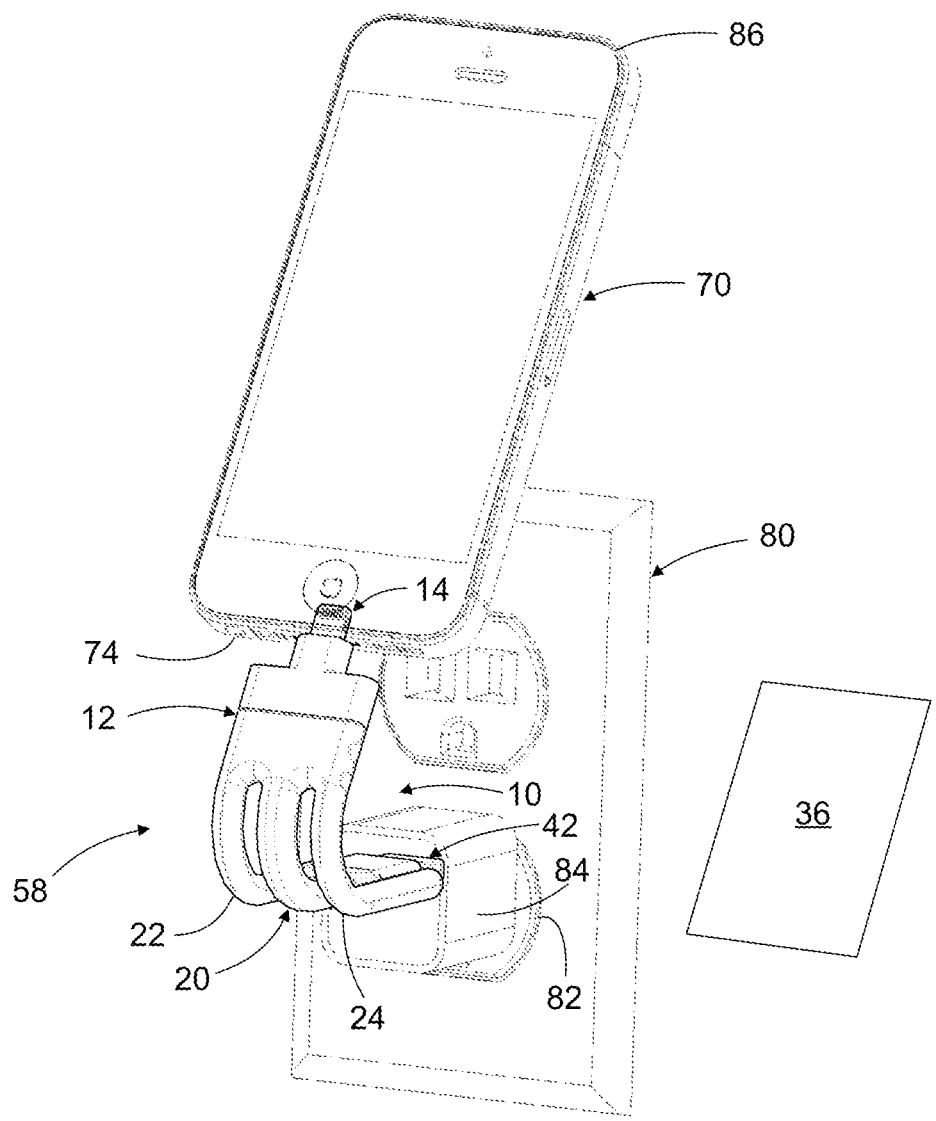
FIG. 5 is a perspective view of the electronics cable of FIG. 1 bent into a third/charging position according to teachings of the invention.
Figure 6:
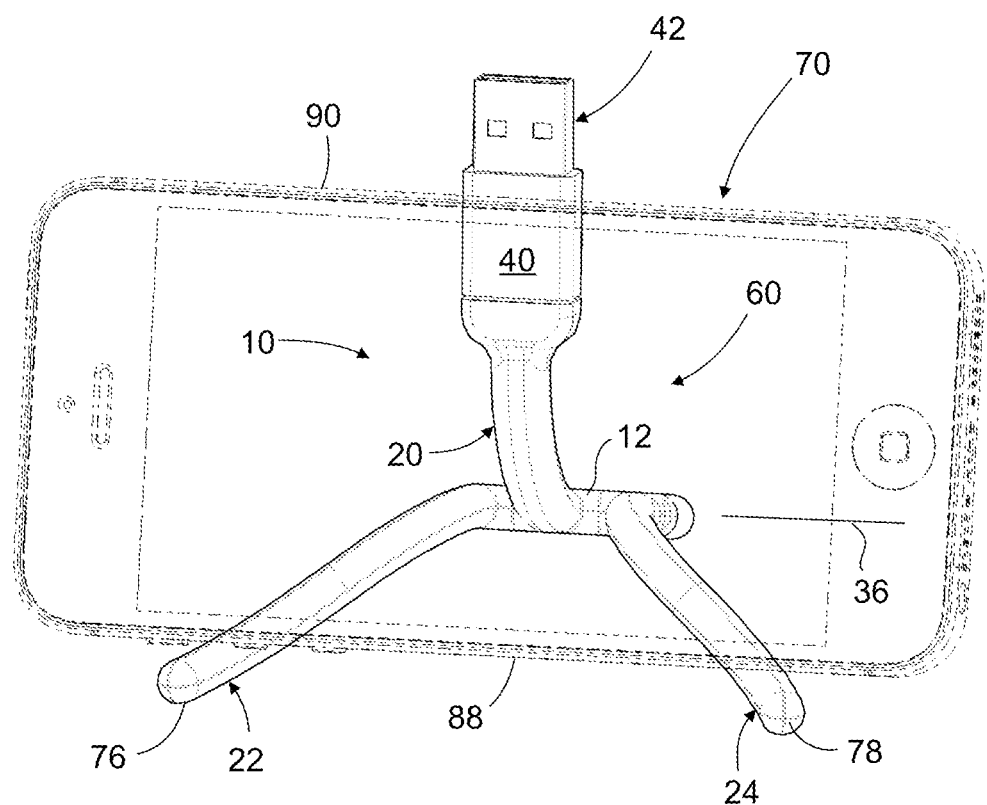
FIG. 6 is a perspective view of the electronics cable of FIG. 1 bent into a fourth/display position according to teachings of the invention.
Figure 7:
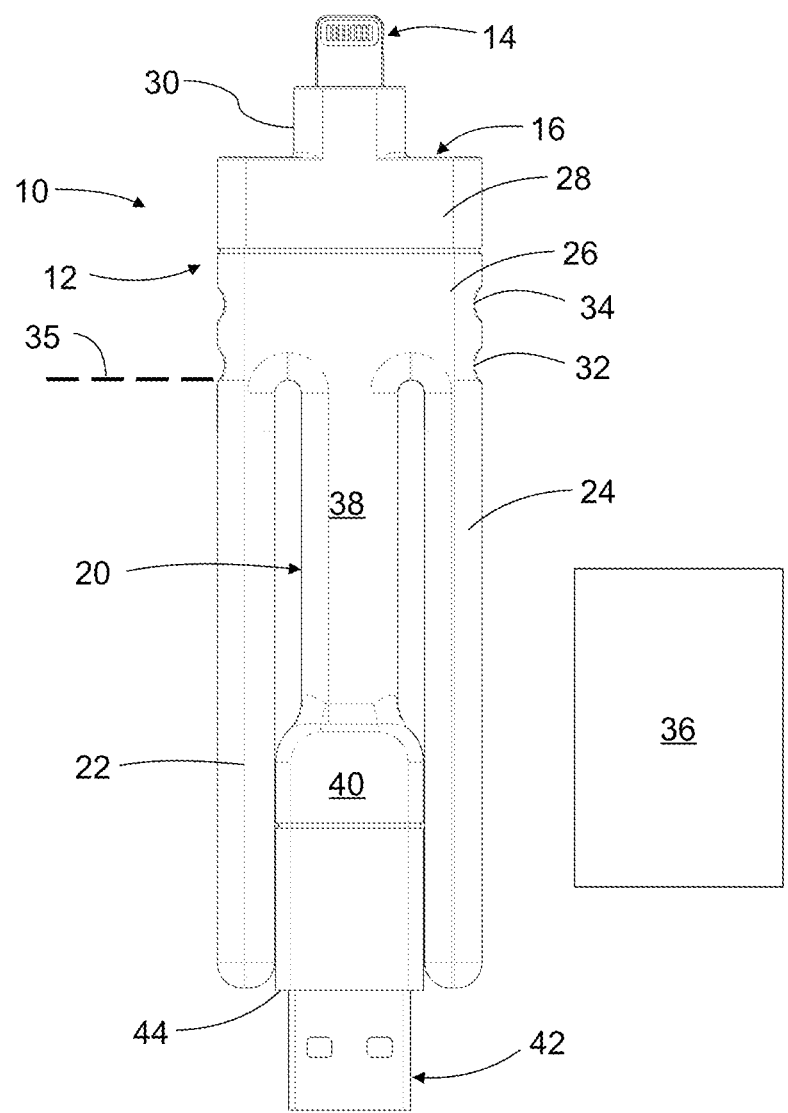
FIG. 7 shows a top plan view of the electronics cable of FIG. 1, the bottom plan view being a mirror image thereof.
Figure 8:
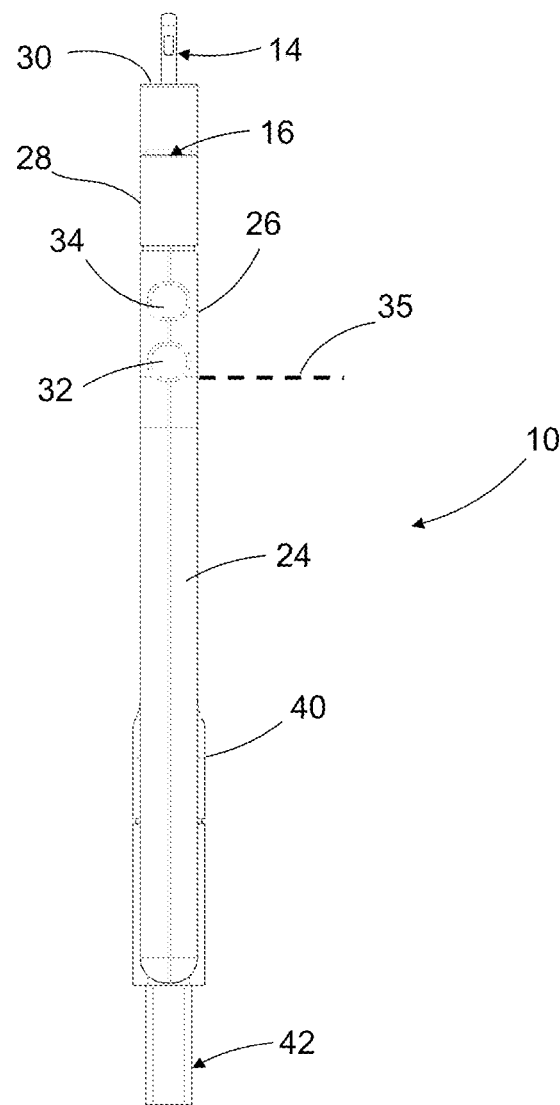
FIG. 8 shows a right elevation view of the electronics cable of FIG. 1, the left elevation being a mirror image thereof.
Figure 9:
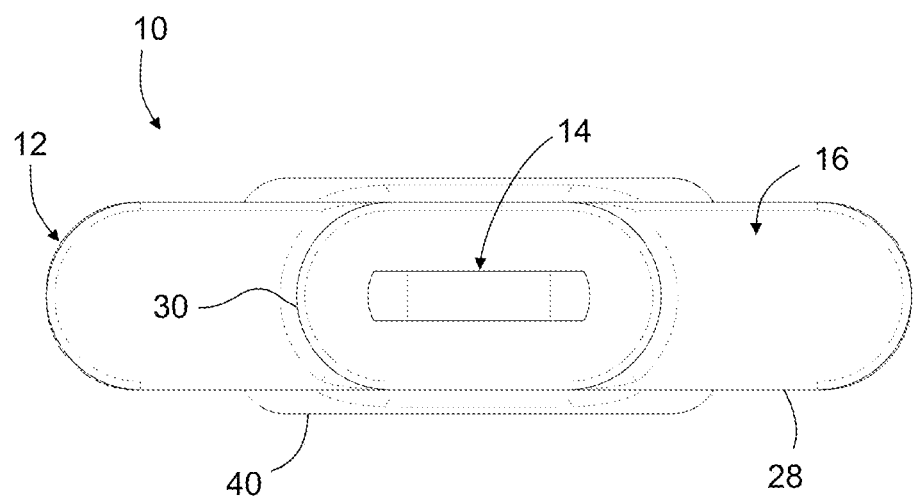
FIG. 9 shows a front elevation view of the electronics cable of FIG. 1.
Figure 10:
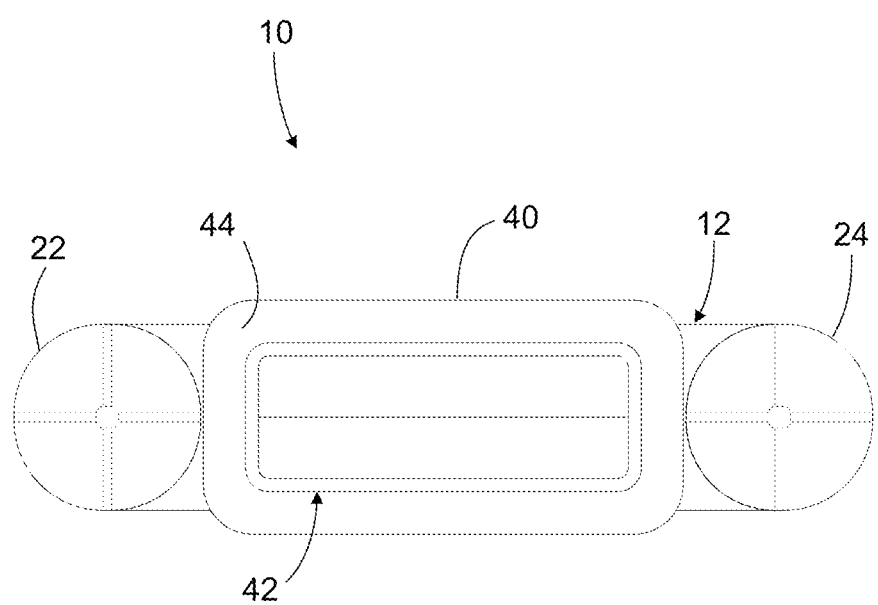
FIG. 10 shows a back elevation view of the electronics cable of FIG. 1.

One or more elongated projections of the cable 10 can be coupled to an opposing terminal end 35 of main body 12 and extend parallel to but in an opposite direction from the first electrical connector 14. In a preferred embodiment as shown in FIG. 1, these projections include three such projections—including a trunk 20 extending coaxially with the connector 14 along cable long axis 18, and left and right legs 22, 24 positioned in the same general plane 36 as the main body 12 and trunk 20 but located to either side of trunk 20. Three such projections are preferred as each could then function as a leg of a tripod support when the cable is reconfigured into different shapes or positions as shown in FIGS. 4-6. However, it is understood that other numbers of projections can be used for various purposes and the invention is not intended to be limited to just three but that fewer or more may be included.

Figure 2:
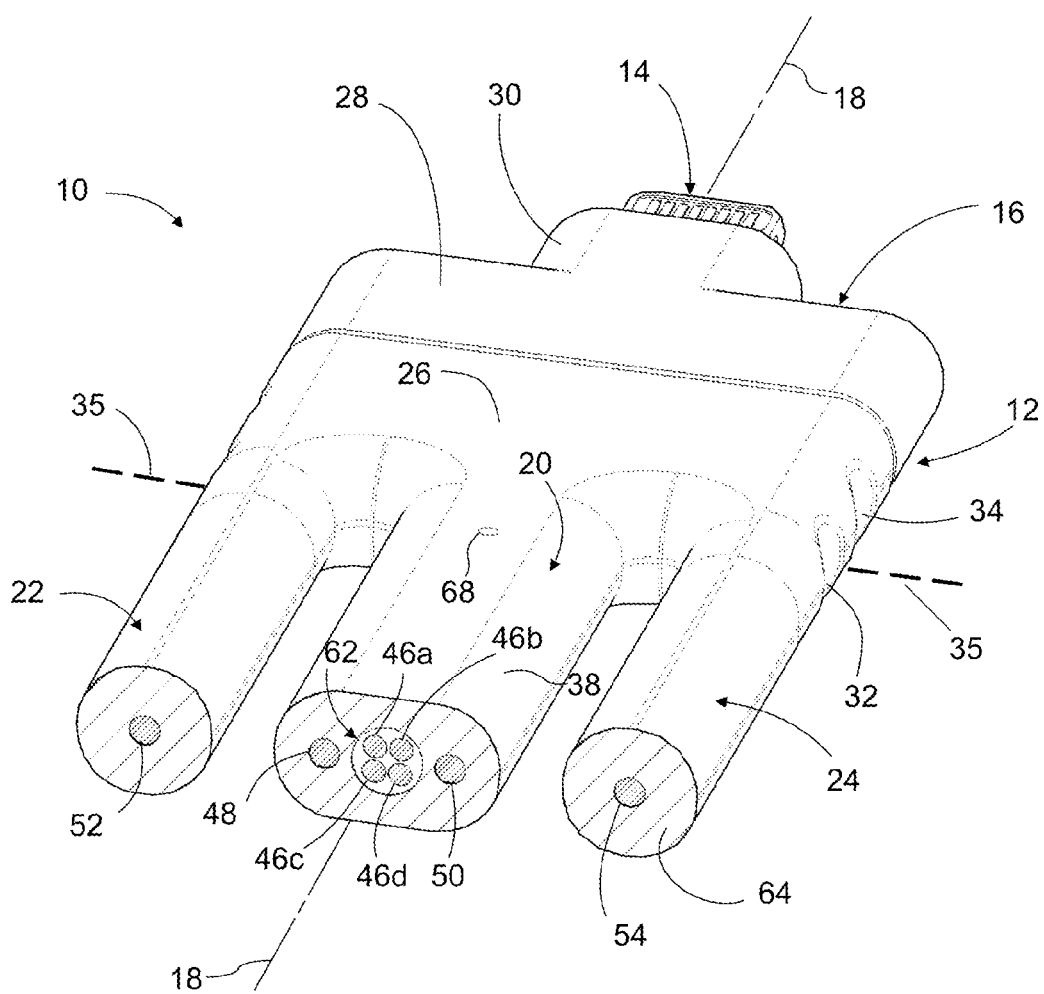
FIG. 2 is a cut-away view taken along line 2-2 of FIG. 1 showing the internal structure of the electronics cable constructed according to a preferred embodiment of the invention.

Trunk 20 includes an elongated trunk portion 38 terminating in a head 40 that flares out from the trunk portion to accommodate the particular electrical components necessary to effect the electrical connector. A second electrical connector 42 is formed on a terminal end 44 of the trunk 20 in coaxial alignment with first connector 14. In the embodiment shown, second connector 42 is a USB-type connector and, as will be appreciated with reference to FIG. 2, is electrically coupled to the first connector 14 via wires 46a-40d running through a core of the trunk 20. As with the first connector 14, however, second connector 42 is not limited to a USB connector but can be any such contemplated to couple an electrical component—e.g. a charging port from an outlet, or communications port on a computer. The second connector 42 can be a different type of connector to the first connector 14, or it may be the same.

Left and right legs 22, 24 extend from the opposing terminal tend 35 of main body 12 and on either side and substantially parallel to trunk 20 such that the body 12, trunk 20, and legs 22, 24 are disposed substantially in the same plane, e.g. plane 36, when the configurable cable 10 is in a first, flattened, or unbent position as shown in FIGS. 1-3 and 7-12. As described below, and particularly with respect to FIGS. 4-6, the trunk 20 and left and right legs 22, 24 are bendable from the first position into at least one of a plurality retained positions out of the plane 36. In a preferred embodiment, the legs 22, 24 and the trunk 20 have substantially similar lengths.

FIG. 2 is a section view of the configurable cable 10 taken along lines 2-2 from FIG. 1 showing the malleable cores—e.g. cores 48, 50 running in parallel along a length of trunk 20 or at least the elongated trunk portion 38, and cores 52, 54 running axially within each of left and right legs 22, 24. Each of these cores 48, 50, 52, 54 are preferably made of a sixteen (16) gauge "soft brass" wire, although other wire thicknesses and material types may be used including aluminum, steel, copper, brass, and more. A key preferred property of these cores is that they are ductile and thus retain their shape when bent. In operation, these cores enable the legs 22, 24 to be bent into the at least one of a plurality of retained positions—e.g. position 56 in FIG. 4, position 58 in FIG. 5, and position 60 in FIG. 6—out of the first position plane 36 so that the legs 22, 24 and trunk 20 are retained in that position without elastically returning to the first position shown in FIG. 1.

Trunk 20 includes a total of two malleable or ductile cores 48, 50 spaced on either side of and running parallel to a central cable 62. Cable 62 is configured to electrically couple the first connector 14 with the second connector 42. In the embodiment shown in FIG. 2, the central cable 62 includes power and data wires including ground path wire 46a, data plus wire 46b, data minus wire 46c, and power wire 46d. It is understood, however, that any number or type of power and data cables is possible provided that they are capable of flexibly bending when cores 48, 50 are bent into a desired shape and direction. Cable 62 can further include a foil wrap, shield braid, and TPU sheath (not shown) so that the wire is maintained as a single unit within trunk 20.

The entire assembly of cable 10, with the exception of the exposed portions of electrical connectors 14 and 42, is overmolded with a thermoplastic elastomer (TPE) layer 64 to encapsulate the wires and define the trunk 20, legs 22, 24, and main body 12. The material used has a preferable durometer of seventy (70) shore A, but other thicknesses and strengths may be used without department from the spirit of the invention. The TPE overmolding process may create molding artifacts, such as hole 66, that correspond to small pins that constrain the cores 48, 50, 52, 58 and electrical cable 62 to ensure that the wires run down the center of each leg 22, 24 and/or trunk 20.

Figure 3:
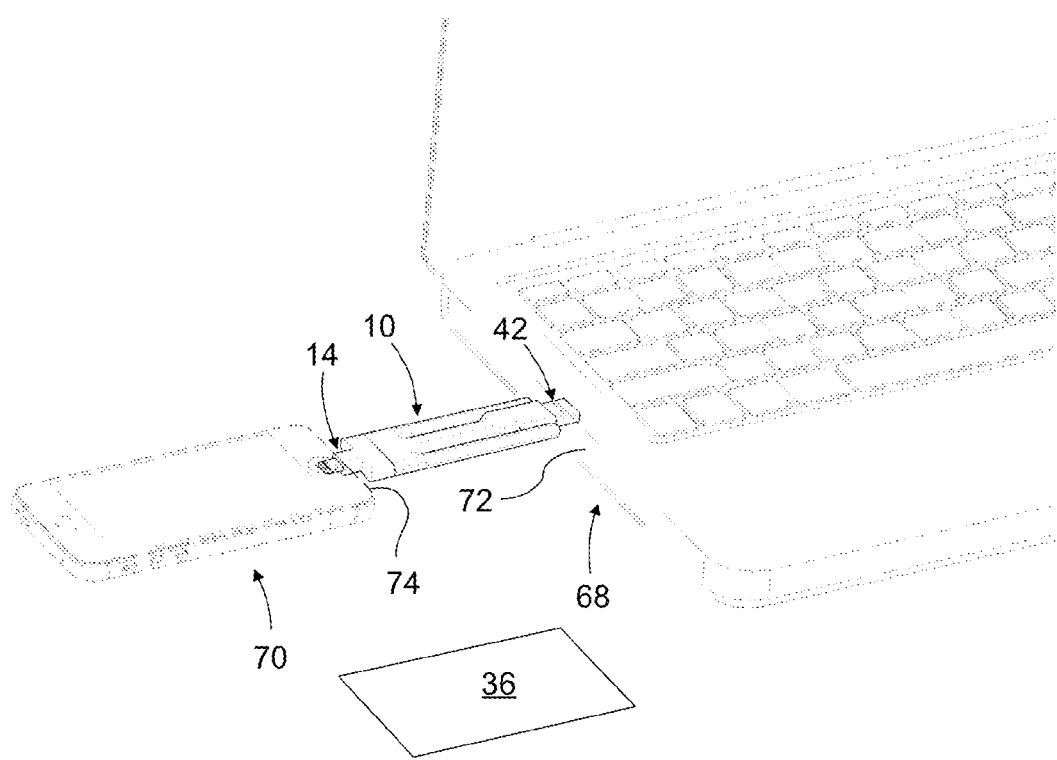
FIG. 3 is a perspective view illustrating the inventive cable in use in a first position between two electronics components.

FIG. 3 illustrates the configurable cable 10 in use to electrically couple a laptop computer 68 with a cell phone/media device 70 (both computer 68 and device 70 shown in dashed lines). Laptop computer 68 has a typical design with USB and other communications ports (not shown) located along a side edge 72 of the laptop. Similarly, cell phone/media device 70 typically includes a combined communications and charging port (not shown) along a lower edge 74 of the cell phone case. The first electrical connector 14 of cable 10 is inserted within the communications and charging port of cell phone/media device 70, and the second electrical connector 42 located on an opposite end of cable 10 is inserted with a corresponding port on the side edge 72 of laptop computer 68. Due to the aligned orientation of the ports on the computer 68 and cell phone/media device 70 within a common plane (not shown), the cable 10 can be used in a flat or unbent position as shown where all equipment rests on a table top.

FIG. 4 illustrates the how the cable 10 can be bent into a retained position 56 showing a tripod configuration. In this configuration 56, trunk 20 is bent (rearward) out of the nominal plane 36 of cable 10. When bent by hand and released in the bent position, the malleable cores 48, 50 (FIG. 2) of the trunk 20 retain the bent position without elastically returning to the nominal first position plane 36. Furthermore, left and right legs 22, 24 can be bent in a second direction (forwardly) out of the nominal plane 36 of cable 10. Terminal ends 76, 78 of respective legs 22, 24 and the second electrical connector 42 comprise tripod supports for the main body 12. When cable 10 is bent in this tripod position 56, the cell phone/media device 70 (shown in dashed lines) may be coupled to and supported upon the first electrical connector 14 so that the screen of device 70 may be maintained in an upright viewing position.

FIG. 5 illustrates the how the cable 10 can be bent into a retained position 58 showing a wall-charging configuration. In this configuration 58, trunk 20 is bent (rearward) out of the nominal plane 36 of cable 10. When bent by hand and released in the bent position, the malleable cores 48, 50 (FIG. 2) of the trunk 20 retain the bent position without elastically returning to the nominal first position plane 36. Furthermore, left and right legs 22, 24 can optionally be bent in the same (rearward) direction out of the nominal plane 36 of cable 10.

Also shown in FIG. 5 for environmental context in dashed lines is a power outlet 80 with a standard three prong connector 82 and a USB wall-charging adaptor 84. Adaptor 84 includes three prongs (not shown) on a back end that plug into the connector 82 of power outlet 80, and a USB port on a front end. With cable 10 bent into wall-charging configuration 58, the second electrical connector 42 (here a USB connector) plugs into the USB port of the adaptor 84 and first electrical connector 14 plugs into the cell phone/media device 70. The device 70 is then charged and reclined in a tipped back position against the wall so that a top end 86 rests against the wall formed in the plane of the outlet 80.

FIG. 6 illustrates how the cable 10 can be bent into a retained position 60 showing a landscape display configuration for media device 70 (shown in dashed lines). In this configuration 60, trunk 20 is bent (upward) out of the nominal plan 36 (running into the page) of cable 10. When bent by hand and released in the bent position, the malleable cores 48, 50 (FIG. 2) of trunk 20 retain the bent position without elastically returning to the nominal first position plane 36. Left and right legs 22, 24 are bent in a second direction (downwardly) out of the nominal plane 36 of cable 10. Terminal ends 76, 78 of respective legs 22, 24 and the main body 12 comprise tripod supports with the trunk 20 and second electrical connector 42 forming the "backrest" support for the media device 70. That is, one long edge 88 of the media device 70 rests against legs 22, 24 of the cable while the opposite long edge 90 is tipped slightly backward and rests against trunk 20—more specifically as shown in FIG. 6, the head 40 of trunk 20. When cable 10 is bent into this tripod position 60, the cell phone/media device may be maintained in a side or panoramic viewing position. Due to the ductile nature of the malleable cores 52, 54 embedded within respective legs 22, 24, these legs may be bent into a slightly curved orientation as shown in FIG. 6 so as to better maintain the lower long edge 88 of the media device 70. Furthermore, the surface of the elastomeric coating can be textured or slightly tacky in order to retain such a mounted device and keep it from sliding off.

FIGS. 7-10 illustrate respective plan, side, and end views of cable 10 in its unbent position with numbering consistent with the above description. Cable 10 includes a main body 12 having a first electrical connector 14 on a terminal end 16 thereof and extending along a long axis 18 of cable 10. As noted above, electrical connector 14 may be any one of a plurality of different connectors adapted to be inserted into a portable media device such as a smart phone, portable game player, tablet, Bluetooth ear buds or MP3 player (not shown). Although the electrical connector 18 shown in the figures is a Lightning connector, other such connectors are possible such as a Micro USB connector, Thunderbolt™ or Mini DisplayPort (MDP), Firewire connector, dock connector (such as the 30-pin connector originally used for Apple, Inc's iPhone and iPod products), 3.5 mm phone connector, video or HDMI connector, or other pin-bus connector without departing from the spirit of the invention.

Main body 12 is configured to encapsulate any necessary electronics to drive the electrical connector 18 and to serve as an integrated mounting platform for the trunk 20 and legs 22, 24 described further below. In one embodiment, the main body 12 is manufactured with a main portion 26 and a cap 28 forming the terminal end 16. Cap 28 can include a connector projection 30 whose dimensions and design are typically dictated by the type of electrical connector 14 used. One or more depressions, e.g. depressions 32, 34, can be formed along one or both outside edges of the main portion 26 to provide a visual cue of where a user of the configurable cable 10 should grasp the cable for use. The cable 10 may be reinforced in this area, as by providing additional structural support or material thickness, so that the cable is less prone to break when used.

One or more elongated projections of the cable 10 can be coupled to an opposing terminal end 35 of main body 12 and extend parallel to but in an opposite direction from the first electrical connector 14. In the preferred embodiment in the figures, these projections include three such projections— including a trunk 20 extending coaxially with the connector 14 along cable long axis 18, and left and right legs 22, 24 positioned in the same general plane 36 as the main body 12 and trunk 20 but located to either side of trunk 20. Three such projections are preferred as each could then function as a leg of a tripod support when the cable is reconfigured into different shapes or positions as shown in FIGS. 4-6. However, it is understood that other numbers of projections can be used for various purposes and the invention is not intended to be limited to just three but that fewer or more may be included.

Trunk 20 includes an elongated trunk portion 38 terminating in a head 40 that flares out from the trunk portion to accommodate the particular electrical components necessary to effect the electrical connector. A second electrical connector 42 is formed on a terminal end 44 of the trunk 20 in coaxial alignment with first connector 14. In the embodiment shown, second connector 42 is a USB-type connector and, as will be appreciated with reference to FIG. 2, is electrically coupled to the first connector 14 via wires 46a-40d running through a core of the trunk 20. As with the first connector 14, however, second connector 42 is not limited to a USB connector but can be any such contemplated to couple an electrical component—e.g. a charging port from an outlet, or communications port on a computer. The second connector 42 can be a different type of connector to the first connector 14, or it may be the same.

Left and right legs 22, 24 extend from the opposing terminal tend 35 of main body 12 and on either side and substantially parallel to trunk 20 such that the body 12, trunk 20, and legs 22, 24 are disposed substantially in the same plane, e.g. plane 36, when the configurable cable 10 is in a first, flattened, or unbent position as shown in FIGS. 1-3 and 7-12. As described below, and particularly with respect to FIGS. 4-6, the trunk 20 and left and right legs 22, 24 are bendable from the first position into at least one of a plurality retained positions out of the plane 36. In a preferred embodiment, the legs 22, 24 and the trunk 20 have substantially similar lengths.

The entire assembly of cable 10, with the exception of the exposed portions of electrical connectors 14 and 42, is overmolded with a thermoplastic elastomer (TPE) layer to encapsulate the wires and define the trunk 20, legs 22, 24, and main body 12. Other molded materials may be used, including PTU, silicone, fabric material, tape wrap, etc. Furthermore, legs 22, 24 need not be limited to encapsulated wire as in the preferred invention but can be bare wire, coiled metal, or bendable linked segments.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:
1. A configurable cable comprising:
 a main body having a first electrical connector on a terminal end thereof;
 a trunk extending from an opposing terminal end of the main body;

a second electrical connector formed on a terminal end of the trunk, wherein the second electrical connector is electrically coupled to said first electrical connector via wires running through a core of the trunk; and left and right legs extending from the opposing terminal end of the main body and on either side and substantially parallel to said trunk such that said body, trunk, and legs are disposed substantially in a plane in a first position of the configurable cable, wherein said trunk and said left and right legs are bendable from the first position into at least one of a plurality of retained positions out of the plane, and wherein each of the left and right legs includes a malleable core formed of a bendable wire running along a length of each of the legs such that when the legs are bent into the at least one of the plurality of retained positions out of the plane, the legs are retained in that position without elastically returning to the first position.

2. The configurable cable of claim 1, the legs further including an elastomeric cover over the bendable wire.

3. A configurable cable comprising:
a main body having a first electrical connector on a terminal end thereof;
a trunk extending from an opposing terminal end of the main body;
a second electrical connector formed on a terminal end of the trunk, wherein the second electrical connector is electrically coupled to said first electrical connector via wires running through a core of the trunk; and
left and right legs extending from the opposing terminal end of the main body and on either side and substantially parallel to said trunk such that said body, trunk, and legs are disposed substantially in a plane in a first position of the configurable cable,
wherein said trunk and said left and right legs are bendable from the first position into at least one of a plurality of retained positions out of the plane, and wherein the trunk and legs each includes a malleable core running along a length of the trunk and legs such that when the trunk and legs are bent into the at least one of the plurality of retained positions out of the plan; the trunk is retained in that position without elastically returning to the first position.

4. The configurable cable of claim 3, wherein the legs are configured to bend in a first direction out of the plane and the trunk is configured to bend in a second direction out of the plane, different from the first direction, such that terminal ends of each of the legs and the second electrical connector formed on a terminal end of the trunk comprise tripod supports for the main body.

5. The configurable cable of claim 3, wherein the malleable core running along a length of the trunk is parallel to the wires running through the core of the trunk and electrically coupling the first electrical connector to the second electrical connector.

6. The configurable cable of claim 3, wherein the first and second electrical connector are different.

7. The configurable cable of claim 3, wherein the first and second electrical connector are taken from a group comprising pin bus connectors, USB connectors, 30-pin dock connectors, Micro USB connectors, Lightning connectors, 3.5 mm phone connectors, HDMI connectors, Mini HDMI connectors, and Thunderbolt connectors.

8. A configurable cable comprising:
a main body having a first electrical connector on a terminal end thereof;
a trunk extending from an opposing terminal end of the main body;
a second electrical connector formed on a terminal end of the trunk, wherein the second electrical connector is electrically coupled to said first electrical connector via wires running through a core of the trunk; and
left and right legs extending from the opposing terminal end of the main body and on either side and substantially parallel to said trunk such that said body, trunk, and legs are disposed substantially in a plane in a first position of the configurable cable,
wherein said trunk and said left and right legs have substantially similar lengths and are bendable from the first position into at least one of a plurality of retained positions out of the plane.

9. The configurable cable of claim 1, wherein the malleable core is formed of soft brass wire.

10. The configurable cable of claim 9, wherein the soft brass wire is 16 gauge.

11. A configurable cable comprising:
a main body having a first electrical connector on a terminal end thereof;
a trunk extending from an opposing terminal end of the main body;
a second electrical connector formed on a terminal end of the trunk, wherein the second electrical connector is electrically coupled to said first electrical connector via wires running through a core of the trunk; and
left and right legs formed of coiled metal or Bendable linked segments extending from the opposing terminal end of the main body and on either side and substantially parallel to said trunk, such that said body, trunk, and legs are disposed substantially in a plane in a first position of the configurable cable,
wherein said trunk and said left and right legs are bendable from the first position into at least one of a plurality of retained positions out of the plane.

* * * * *